Figure 10:
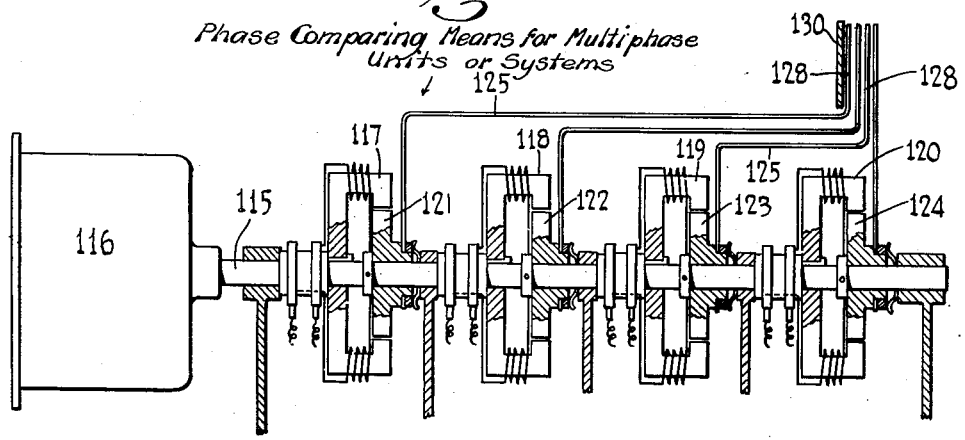

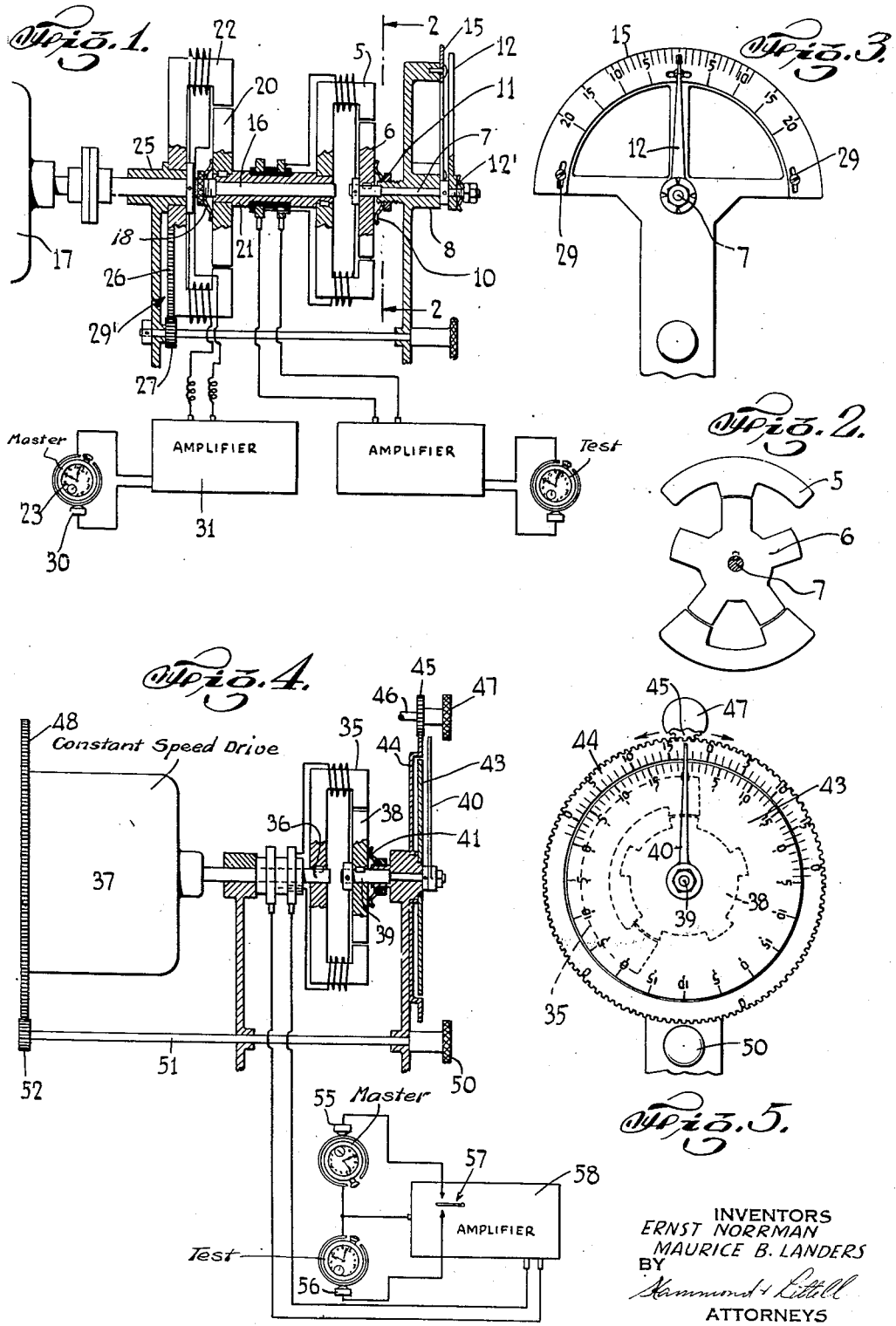

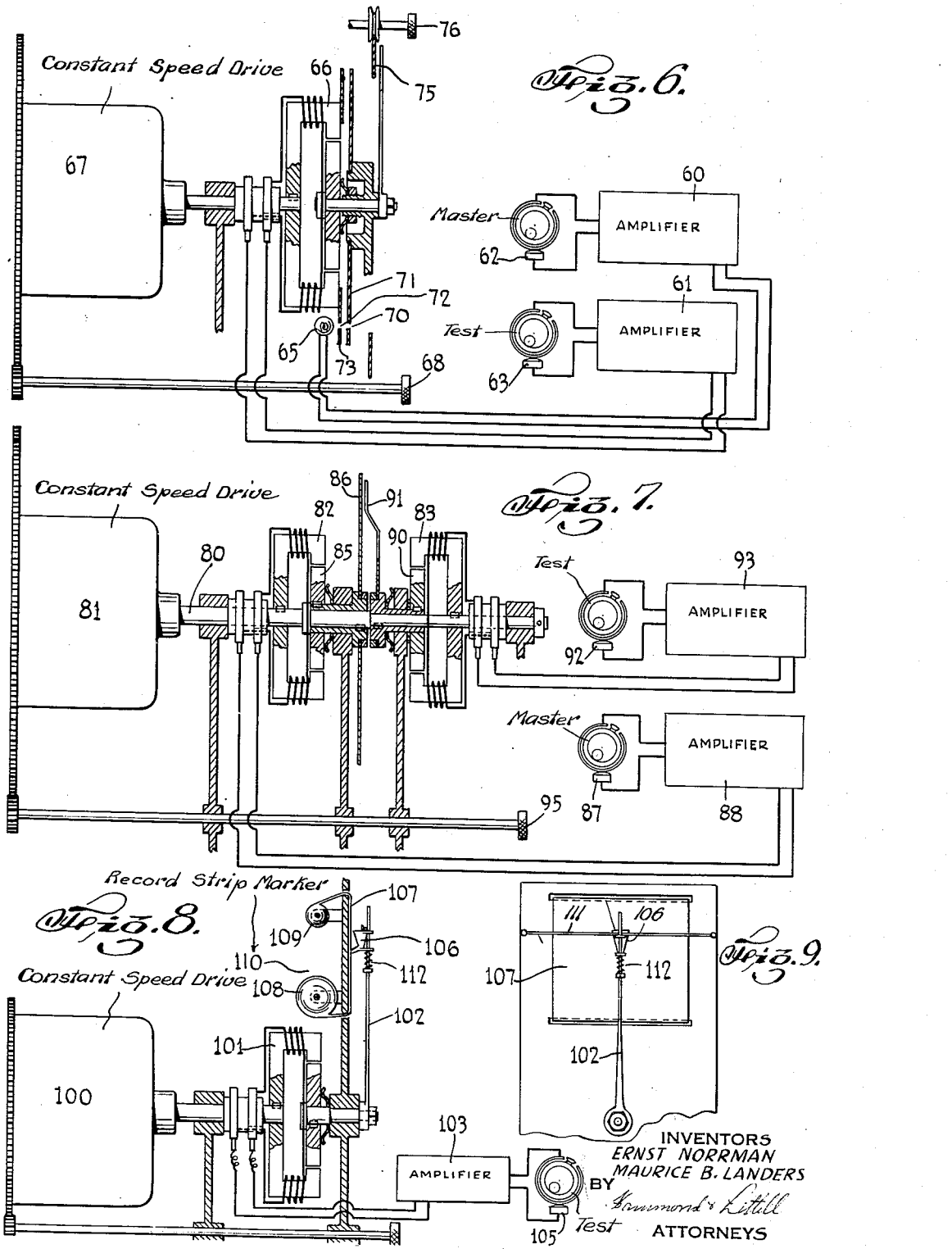

Jan. 23, 1940.   E. NORRMAN ET AL   2,188,059
APPARATUS FOR TIMING WATCHES
Filed June 10, 1938   3 Sheets-Sheet 3

Phase Comparing Means for Multiphase Units or Systems

INVENTORS
ERNST NORRMAN
MAURICE B. LANDERS
BY
Hammond & Littell
ATTORNEYS

Patented Jan. 23, 1940

2,188,059

UNITED STATES PATENT OFFICE 2,188,059

APPARATUS FOR TIMING WATCHES

Ernst Norrman, Chicago, Ill., and Maurice B. Landers, New York, N. Y.

Application June 10, 1938, Serial No. 212,952

6 Claims. (Cl. 73—51)

The present invention relates to apparatus for comparing the rates of regularly recurring impulses derived from different sources and apparatus for determining the phase difference between sets of regularly recurring impulses.

In the course of the manufacture and repair of the ignition systems of internal combustion engines, for example, it is desirable to ascertain accurately the phase differences of the timing mechanism in operation.

In the course of the manufacture of watches and in the course of repair of the same, it is desirable to test the accuracy of the watches in various positions and, further, it is desirable that this testing may be accomplished in as short a time as possible. To meet this requirement watch testing apparatus of various types has been developed.

The present invention has for an object to provide a timing apparatus for comparing rates of impulses which is easily operated and convenient to read, and one in which the likelihood of mistakes in handling is reduced to the minimum.

Another object is to provide apparatus by which the difference in phase between two sets of recurring impulses can be quickly and readily ascertained.

Another object is to provide apparatus particularly adapted for timing watches quickly and effectively.

Still another object is to provide an arrangement for timing watches such that any suitable accurate time source may be used, including tuning forks, accurately running motors or accurate pocket watches.

The invention has been developed more especially in connection with the production of a watch timing apparatus designed to facilitate comparison of the rate of a watch to be tested with the rate of a master watch and for the purposes of illustrating the principles of the invention such an apparatus will be described. In the preferred form of the apparatus as constructed a master watch and a watch to be tested are applied to separate tick responsive devices such as microphones. A main rotatable member is driven in such a manner that its rate of movement is controlled in response to the ticks of the master watch and this rotatable member carries an electro-magnet which is energized momentarily in response to each tick of the watch to be tested. An indicator so mounted as normally to remain at rest carries an armature closely adjacent to the path of movement of the electromagnet and in position to be controlled by the electro-magnet when momentarily energized. If the watch under test is neither fast nor slow as compared with the master watch, then the indicator element will remain at rest because the electro-magnet will always be in the same position during its rotation at the moment when it is energized. If the watch under test ticks at a rate faster or slower than the master watch the indicator connected to the armature will be moved in one direction or the other, but the movement will correspond only to the difference in rate between the master watch and the watch under test. It will, therefore, move slowly enough to be easily observed.

The nature and objects of the invention will be better understood from a description of a particular embodiment thereof for the purpose of which description reference should be had to the accompanying drawings forming a part thereof and in which—

Figure 11:
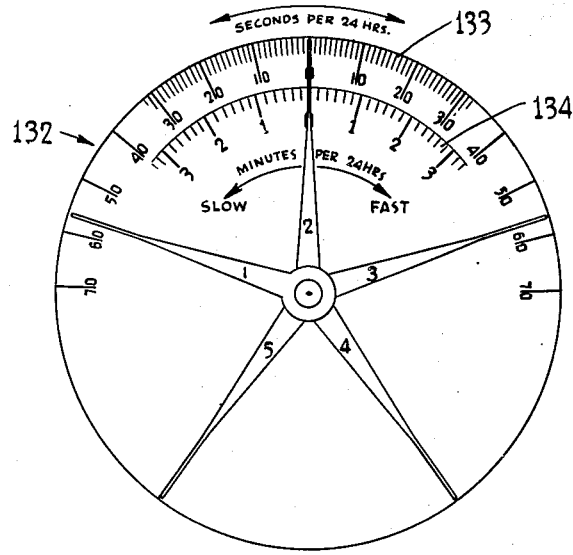

Figure 1 is a sectional view taken centrally through an apparatus embodying the principles of the invention, Fig. 2 is a sectional view taken on the line 2—2 of Fig. 1, Fig. 3 is an end view of the same, Fig. 4 is a diagrammatic view of a somewhat simpler embodiment of the invention, Fig. 5 is a view in elevation taken from the right on the line 5—5 of Fig. 4, Fig. 6 is a diagrammatic view similar to Fig. 4 showing a somewhat different embodiment, Fig. 7 is a diagrammatic view showing still another embodiment of the invention, Fig. 8 is a diagrammatic view showing a recording mechanism embodying principles of the invention, Fig. 9 is an end view of the arrangement shown in Fig. 8, Fig. 10 is a diagrammatic view showing an embodiment of the invention designed more especially for testing the ignition system of internal combustion engines, Fig. 11 is a view showing an indicating hand and scale.

In the embodiment of the invention shown in Fig. 1 of the drawings for the purposes of illustration, an electromagnet 5 is rotated at a constant speed. Between the poles of the magnet an armature 6 is rotatably mounted in position to be momentarily actuated by the electro-magnet 5 when energized. The armature 6 is carried on the shaft 7 which is rotatable in the bearing 8 and normally held against rotation by an adjustable friction brake 10. The resistance of the brake can be adjusted by means of the nut 11. On the opposite side of the bearing 8 the shaft 7 carries an indicator hand 12 which moves closely adjacent a graduated dial or scale 15. The electro-magnet 5 is energized momentarily under control of the watch to be tested in such manner that at each tick of the watch a momentary current energizes the electro-magnet which thereby acts upon the armature 6. Now, if the watch being tested is running exactly in synchronism with the rotation of the electro-magnet 5, then the magnet will be in the same position each time that it is energized and the armature 6 will, therefore, not be moved from its position. If, however, the rate of the watch is faster or slower than the rate of the electro-magnet, then the energization of the electro-magnet 5 will be in lead or lag position with respect to the armature 6 at the moment of each successive energization and the armature will, therefore, be moved correspondingly upon each tick of the watch. It follows that the hand 12 will move adjacent the scale 15, at a rate corresponding to the difference between the rate of the watch being tested and the rate of rotation of the electro-magnet 5.

The electro-magnet 5 may be rotated in any suitable or desired manner which will provide sufficient accuracy. For example, it may be driven by a synchronous motor under control of a tuning fork or other accurate standard. In the arrangement shown, this magnet is carried on the main shaft 16 of a substantially constant speed motor 17 to which shaft it is connected by an adjustable friction clutch 18. The motor 17 may be designed to drive the shaft 16 at a speed of 1 revolution per second and suitable provision is made for correcting the rate of rotation of the electro-magnet 5 under control of a master watch. An armature 20 is carried on the sleeve shaft 21 which also carries the electro-magnet 5. This armature rotates between the poles of a stationary electro-magnet 22 which is arranged to be momentarily energized under control from a master watch 23 through an amplifying circuit.

If the rotation of the shaft 16 and armature 20 is in synchronism with the ticks of the master watch then the poles of the armature will be in the same relative positions between the poles of the electro-magnet 22 at the instant of each tick of the master watch, and therefore at each energization of the magnet, the magnet will not move the armature. If, however, the rotation of the shaft 16 which carries the armature is fast or slow then the armature will tend to lead or lag and the momentary energy of the magnet will give the armature a slight corrective movement at each tick of the master watch. The additional corrective movement thus given to the armature 20 and the electro-magnet 5 provides the required accuracy and permits the use of a motor which alone would not be sufficiently accurate for watch testing.

It is desirable to provide means for relative adjustment between the indicator hand 12 and the graduated dial 15 in order to bring the hand 12 opposite the "0" of the dial when beginning a test. If the hand is further from the "0" than the angle between two adjacent armature poles, it can be slipped one or more poles for effecting a part of the framing. This is possible because the relation of the armature with reference to the magnet 5 is such that this movement will simply bring a different set of poles of the armature into the field of action of the poles of the electro-magnet. More accurate adjustment to bring the hand 12 to the "0" of the dial can be accomplished by rotation of the electro-magnet 22. As shown, the magnet 22 is adjustably mounted on the outside of the bearing 25 in which the shaft 16 is rotatable. The magnet carries a gear 26 which is engaged by a hand pinion 27 for convenient manual adjustment. The framing of the dial 15 and indicator hand by movement of the dial instead of moving the hand is of course possible. There are some advantages as a matter of convenience in an arrangement whereby one may either move the hand as above indicated or move the dial as convenience at the moment may require. The dial accordingly is shown as supported by a pin and slot arrangement 29 which permits such movement of the dial. A rack and pinion arrangement as indicated at 29' may be provided to facilitate accurate adjustment of the dial.

As a further provision for bringing the hand 12 to a convenient position for framing or zeroizing, the hand 12 may be frictionally connected to the shaft 7 as by an adjustable friction clutch 12', the friction of which is less than that of the friction brake 10 but sufficient to avoid accidental slipping in use. If necessary, when adjusting the hand on shaft 7 the armature 6 or shaft 7 may be held in fixed position by hand or by a device provided for this purpose.

In Fig. 1 the amplifying arrangement by which the electro-magnet 22 is energized under control of the master watch is indicated diagrammatically. The master watch 23 is placed on a microphone 30. Upon each tick of the watch the amplifier 31 delivers a strong but short electrical impulse to the electro-magnet 22. This amplifier may be constructed in accordance with principles set forth in previous patents granted to Ernst Norrman #2,058,616 and #2,064,559.

The electrical circuit for energizing the electro-magnet 5 in response to the ticks of the watch to be tested is similar to that for the electro-magnet 22 but the constants may be different since substantially less strength of current is required. The electro-magnet 5 rotates during operation and, therefore, the electrical connections from the amplifier are made through slip rings in accordance with usual practice.

The relative adjustment of the brake 10, the friction clutch 18 and the power of the electro-magnets can be determined in part by calculation and in part by trial and adjustment.

The hand 12 and armature 6 with the connected parts should be made substantially of as light weight as possible.

The brake 10 should be made to apply just sufficient friction ordinarily to hold the parts against rotation and to prevent overthrow of the armature after it is moved by the impulse of the electro-magnet, but not sufficient to prevent the necessary movement under the force of the impulse of the electro-magnet 5. The power of the electro-magnet 5 should be sufficient to move the armature 6 and associated parts but the impulse should be of such short duration that the magnet rotates only through an arc of negligible magnitude during the impulse. Practice has proved that this adjustment is quite easily made after a few trials.

Ordinarily if the strength of the magnet is well designed, the armature 6 will readily get into step with the rotating magnet even though when the watch under test is first applied to its microphone the armature 6 is entirely out of step with the magnet impulses.

The electro-magnet 5, the armature 20 and the associated parts should be made relatively light in order that they may be readily controlled by electro-magnet 22 without the expenditure of undue power. On the other hand they are preferably of sufficient inertia to avoid movement of the electro-magnet 5 instead of the armature 6 by the energy of the magnet 5. The friction clutch 18 should be of sufficient power normally to hold the electro-magnet 5 in rotation with the shaft 16 but it must permit movement of the armature on the shaft under impulses of the electro-magnet 22 when the armature 20 is out of step with said impulses. It should be of sufficiently more power than brake 10, so that magnet 5 and armature 20 will not themselves be rotated when the magnet is energized instead of rotating armature 6.

While the several adjustments must be made with care they are nevertheless not too critical, and smooth operation can quite easily be obtained in practice.

The form of the electro-magnets and armatures controlled thereby may vary in accordance with the requirements of operation. The particular apparatus illustrated is designed for use with watches having five beats to the second and the motor shaft 16 is designed to rotate at a substantially constant speed of one rotation per second. For this design the armatures are both of the five pole type as shown in Fig. 2.

One pole of the armature will thus be opposite the corresponding pole of the magnet in each case at each tick of the corresponding watch. As shown, the upper magnet pole is single and at the moment of operation is opposite a pole of the armature. The lower magnet pole is shown as double to lie opposite two poles of the armature at the moment of actuation. This design is selected as readily giving a mechanically balanced construction for the rotating part but obviously the lower pole can be made single to lie opposite one or another of the poles of the armature.

For the purposes of testing, for example, a six beat watch the armature 6 could be replaced by a suitable 6 pole armature and the electro-magnet could be correspondingly modified.

It is possible furthermore to design the armature 6 with a relatively large number of poles which will be a multiple of the number of beats per second of various watches to be tested. Suppose, for example, the armature 6 has thirty poles then with either a five beat or six beat watch applied to the test watch microphone, a pole of the armature would be opposite a pole of the electro-magnet at the instant of each tick and the apparatus would then operate to test either of such watches. If provision were made for eliminating alternate tick impulses, a fifteen pole armature could be used.

In Fig. 4 there is shown another embodiment of the invention wherein an electro-magnet 35 is rigidly mounted on the shaft 36 of motor 37. The armature 38 on shaft 39 which shaft carries also indicating hand 40 is controlled upon energization of the electro-magnet 35. The magnet will be energized by short impulses each time the actuating watch ticks. The armature 38 therefore will line up with the poles of the magnet 35 in their position at the instant of the ticks. A friction brake 41 inhibits uncontrolled rotation of the armature. Adjacent the indicating hand 40 are two scales, a fixed scale 43 and an adjustable scale 44, the latter being arranged to be adjusted by pinion 45 on the shaft 46 which carries also a thumb wheel 47. The motor 37 carries a gear 48 and can be rotated by means of a hand wheel 50 on shaft 51 through the pinion 52 engaging the gear 48. In the usual use of this arrangement the difference in phase between two watches or other impulse originating devices is ascertained at the beginning and end of the test period, thereby to ascertain the difference in rate. As shown, a master watch is positioned on the microphone 55 and a test watch on the microphone 56. A switch 57 is arranged to connect these watches alternatively to the amplifier 58. In operation to compare the rate of the tested watch with the master watch the switch 57 is first connected to include the test watch microphone 56 in the amplifier circuit and the motor is rotated by means of the hand wheel 50 to bring the indicating hand 40 opposite a zero of the scale 43. Switch 57 is then moved to connect the master watch microphone 55 to the amplifier circuit and the armature 38 will then line up with the position of the magnet at the instant of the tick of the master watch. The difference in phase between the ticks of the two watches will then be indicated by the position of the indicating hand 40 on the dial 43. The scale 44 is then adjusted by means of the hand wheel 47 to bring a zero in line with the indicator hand 40. At the end of the test period (½ minute, 1 minute, or longer) the difference in phase between the two watches or the like is again ascertained and the gain or loss will indicate the comparative rates of the two watches. The indicating hand 40 is now and has been under control of the master watch during the test period and if there has been a difference in rate between the motor and the master watch the hand 40 will have drifted away from the zero on the scale 44. If so, it is now reframed or brought back to the zero by the hand wheel 50. The switch 57 is then moved to connect the test watch microphone 56 to the amplifier 58 and the reading of the position of the hand is taken on the dial 43. This will give the gain or loss of the test watch as compared with the master watch.

In Fig. 6 another embodiment which in many respects is similar to the embodiment shown in Fig. 4 is shown. In this embodiment the arrangement of the motor, electro-magnet, armature and indicator hand are the same as in Fig. 4. Separate amplifiers 60 and 61 are provided for the master and test watch microphones 62 and 63. A flash lamp 65 is energized from the master watch microphone and the electro-magnet 66 is energized from the test watch microphone. The framing in this case is accomplished by rotating the motor 67 by the hand wheel 68 until the flashes of the lamp 65 are visible through sight opening 70 in a fixed mask or screen 71 which may be a part of the casing of the apparatus and through one of five sight openings 72 in a screen 73 secured to and rotatable with the electro-magnet 66. There are five openings 72 because this apparatus is arranged for testing five beat watches. The motor may be moved for framing from time to time or substantially continuously during the test period. The scale 75 may be adjusted by the hand wheel 76 for convenience in reading.

In Fig. 7 the shaft 80 of the motor 81 carries two electro-magnets 82 and 83 rigidly secured thereto. The electro-magnet 82 controls an armature 85 and dial 86 in accordance with the ticks of the master watch on microphone 87 through amplifier 88 in accordance with the principles previously herein explained. The electro-magnet 83 similarly controls armature 90 and hand 91, under control of the tested watch on the microphone 92 through amplifier 93. The hand 91 operates closely adjacent the dial 86 whereby the difference in phase between the ticks of the two watches can readily be read for purposes of comparison. A hand wheel 95 is provided for rotating the motor in order that a zero of the dial may be brought to a more convenient position when desired.

Fig. 8 shows an arrangement in which the principles of the invention are applied to a recording device. The arrangement of the motor 100, electro-magnet 101 and the indicating hand 102 with the amplifier 103 and the microphone 105 for the watch to be tested will be readily understood in view of the foregoing description of the other embodiments shown in the drawings. It is assumed that the motor 100 in this arrangement is sufficiently accurate for the purposes of the record to be made. The hand 102 carries an inking device 106 which bears against a paper record strip 107 which is wound to and from the rolls 108 and 109 by any suitable mechanism. A mere hand crank 110 is shown diagrammatically as a sufficiently illustrative means for moving the paper strip. In order that the inking device 106 may move in a straight line across the record strip a guide bar 111 extends transversely of the record strip and the inking device is pressed thereagainst by a spring 112.

In Fig. 10 an apparatus is illustrated diagrammatically which is designed for use in ascertaining the timing of the ignition of a four cylinder internal combustion engine. The shaft 115 of the motor 116 carries four electro-magnets 117, 118, 119 and 120 arranged to be energized respectively from the four ignition impulses of the engine cylinders. The armatures 121 to 124 are controlled as in the cases of the other arrangements heretofore described. These armatures are connected to operate the indicating hands 125 which are diagrammatically indicated as so bent as to have their upper ends 128 closely adjacent the scale 130.

In Fig. 11 an alternative form of indicating hand for a five beat watch testing device is shown at 132 wherein five hands positioned 72° apart are substituted for the single hand indicated in the other views. These hands are numbered 1, 2, 3, 4 and 5 for convenience in reading and to avoid error due to mistaking of one hand for another. The scale in front of which this five armed hand appears is shown as carrying two sets of graduations. The graduations 133 on the periphery are calculated to show the gain or loss in seconds per twenty-four hours, if the test period is five minutes. The graduations 134 are designed to show the gain or loss in minutes per twenty-four hours if the test period is one minute.

Various modifications of the particular construction such as provision for operation at alternate ticks of the watch and the application of other expedients such for example as suggested in the Norrman Patent #2,064,559, may be applied in the practice of the present invention. The particular description is illustrative merely and is not intended as defining the limits of the invention.

We claim:

1. In a watch timing apparatus, in combination, a shaft, means to drive said shaft at a substantially constant speed, an electro-magnet on said shaft, a tick responsive device adapted to receive a master watch, means controlled by said tick responsive device to correct the rotation of said electro-magnet to maintain the rotation of the electro-magnet in synchronism with the master watch, an indicating member, an armature connected thereto and positioned to be controlled by said electro-magnet, a tick responsive device adapted to receive a watch to be tested, means controlled by said second mentioned tick responsive device momentarily to energize said electro-magnet in response to ticks of the watch to be tested, whereby the indicating member will be controlled to indicate the rate of the watch to be tested.

2. In a watch timing apparatus, in combination, an electro-magnet, means to rotate the electro-magnet at a substantially constant speed, a tick responsive device adapted to respond to ticks of a master watch, actuating means controlled by the tick responsive device operatively connected to additionally control the rotation of the electro-magnet to synchronize the same with the master watch, a second tick responsive device also adapted to respond to ticks of a watch to be tested, means controlled by the second tick responsive device momentarily to energize the electro-magnet, and indicating means controlled by the electro-magnet.

3. In a watch timing apparatus, in combination, a motor, a shaft driven thereby at a substantially constant rate, a rotatable electro-magnet frictionally connected to said shaft but capable of rotative movement relative thereto, means for rotating said electro-magnet on said shaft to compensate for variations of the rate of rotation of said motor, an armature adjacent said electro-magnet mounted normally to remain at rest but capable of momentary movement by said electro-magnet and means for momentarily energizing said electro-magnet in response to ticks of a watch to move said armature in one direction or the other as the watch ticks are more or less frequent than a given rate.

4. In a watch timing apparatus, in combination, an electro-magnet, means for rotating the electro-magnet at a substantially constant speed, a beat responsive device adapted to respond to periodic beats of a control device, means controlled by the responsive device for correcting any variations in the speed of rotation of the electro-magnet to maintain the rotation of the electro-magnet in synchronism with the control device, a tick responsive device adapted to respond to ticks of a watch to be tested, means controlled by the tick responsive device momentarily to energize the electro-magnet, and indicating means controlled by the electro-magnet.

5. In a watch timing apparatus, in combination, an electro-magnet, means for rotating the electro-magnet at a constant speed, an armature positioned within the field of the electro-magnet to be controlled thereby, a tick responsive device adapted to respond to ticks of a watch to be tested, and an electrical circuit controlled by the tick responsive device and connected to momentarily energize the electromagnet at intervals corresponding to the ticks, whereby the position of the armature is controlled by the ticks to give an indication of the rate thereof.

6. In apparatus of the character described, in combination, a rotatable member, an electro-magnet carried by the rotatable member, means for periodically momentarily energizing the electro-magnet, an armature mounted substantially concentrically with the rotatable member and within the field of the electro-magnet, and means for frictionally normally maintaining the armature at rest, the friction being not so great as to prevent the armature from moving into alignment with the electro-magnet when it is momentarily energized but being sufficient to prevent over-running of the armature upon the termination of the momentary energization.

ERNST NORRMAN.
MAURICE B. LANDERS.